United States Patent
El-Kurdi et al.

(10) Patent No.: US 11,769,007 B2
(45) Date of Patent: Sep. 26, 2023

(54) TREEBANK SYNTHESIS FOR TRAINING PRODUCTION PARSERS

(71) Applicant: International Business Machines Corporation, Armonk, NY (US)

(72) Inventors: Yousef El-Kurdi, Mahopac, NY (US); Radu Florian, Danbury, CT (US); Hiroshi Kanayama, Yokohoma (JP); Efsun Kayi, Bedford Corners, NY (US); Laura Chiticariu, San Jose, CA (US); Takuya Ohko, Tokyo (JP); Robert Todd Ward, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 17/303,349

(22) Filed: May 27, 2021

(65) Prior Publication Data
US 2022/0382972 A1 Dec. 1, 2022

(51) Int. Cl.
*G06F 40/205* (2020.01)
*G06N 3/04* (2023.01)
(Continued)

(52) U.S. Cl.
CPC ............ *G06F 40/205* (2020.01); *G06F 40/47* (2020.01); *G06N 3/04* (2013.01); *G06N 3/088* (2013.01)

(58) Field of Classification Search
CPC ........ G06F 40/00; G06F 40/137; G06F 40/14; G06F 40/143; G06F 40/146;
(Continued)

(56) References Cited

U.S. PATENT DOCUMENTS

| 9,471,559 B2 | 10/2016 | Castelli |
| 10,706,236 B1 | 7/2020 | Platt |

(Continued)

FOREIGN PATENT DOCUMENTS

| CN | 104281564 B | 1/2015 |
| CN | 104991890 A | 10/2015 |

(Continued)

OTHER PUBLICATIONS

Dozat, Timothy; Manning, Christopher; "Deep Biaffine Attention for Neural Dependency Parsing", Mar. 10, 2017, ICLR (Year: 2017).*

(Continued)

*Primary Examiner* — Andrew C Flanders
*Assistant Examiner* — Alexander Joongie Kim
(74) *Attorney, Agent, or Firm* — Stephen R. Yoder

(57) ABSTRACT

An approach for generating synthetic treebanks to be used in training a parser in a production system is provided. A processor receives a request to generate one or more synthetic treebanks from a production system, wherein the request indicates a language for the one or more synthetic treebanks. A processor retrieves at least one corpus of text in which the requested language is present. A processor provides the at least one corpus to a transformer enhanced parser neural network model. A processor generates at least one synthetic treebank associated with a string of text from the at least one corpus of text in which the requested language is present. A processor sends the at least one synthetic treebank to the production system, wherein the production system trains a parser utilized by the production system with the at least one synthetic treebank.

18 Claims, 5 Drawing Sheets

(51) Int. Cl.
　　　*G06N 3/088*　　(2023.01)
　　　*G06F 40/47*　　(2020.01)
(58) Field of Classification Search
　　　CPC ...... G06F 40/151; G06F 40/154; G06F 40/16; G06F 40/166; G06F 40/169; G06F 40/20; G06F 40/205; G06F 40/211; G06F 40/216; G06F 40/263; G06F 40/279; G06F 40/284; G06F 40/40; G06F 40/42; G06F 40/47; G06F 40/45; G06F 40/44; G06N 3/00; G06N 3/02; G06N 3/04; G06N 3/0464; G06N 3/0475; G06N 3/0495; G06N 3/0499; G06N 3/084; G06N 3/088
　　　See application file for complete search history.

(56) References Cited

U.S. PATENT DOCUMENTS

| | | | |
|---|---|---|---|
| 2006/0277028 A1* | 12/2006 | Chen | G06F 40/216 704/4 |
| 2016/0259851 A1 | 9/2016 | Hopkins | |
| 2021/0264106 A1* | 8/2021 | Li | G06F 18/2155 |

FOREIGN PATENT DOCUMENTS

| | | |
|---|---|---|
| CN | 106708800 A | 5/2017 |
| CN | 107391488 A | 11/2017 |
| CN | 106598951 B | 8/2019 |
| KR | 20160050652 A | 5/2016 |

OTHER PUBLICATIONS

Alimova, Ilseyar; Tutubalina, Elena; Kirillovich, Alexander; "Cross-lingual Transfer Learning for Semantic Role Labeling in Russian", Jun. 2020, CLIB, 4th, pp. 72-80 (Year: 2020).*

Wu, Shijie; Conneau, Alexis; Li, Haoran; Zettlemoyer, Luke; Stoyanov, Veselin; "Emerging Cross-lingual Structure in Pretrained Language Models", May 7, 2020, ACL, 58th, pp. 6022-6034 (Year: 2020).*

Tiedemann, Jorg; Agic, Zeljko; "Synthetic Treebanking for Cross-Lingual Dependency Parsing", Jan. 27, 2016, JAIR, vol. 55, pp. 209-248 (Year: 2016).*

Alimova, Ilseyar; Tutubalina, Elena; Kirillovich, Alexander; "Cross-lingual Transfer Learning for Semantic Role Labeling in Russian", Jun. 2020, CLIB, 4th, pp. 72-80 (Year: 2020) (Year: 2020).*

Wu, Shijie; Conneau, Alexis; Li, Haoran; Zettlemoyer, Luke; Stoyanov, Veselin; "Emerging Cross-lingual Structure in Pretrained Language Models", May 7, 2020, ACL, 58th, pp. 6022-6034 (Year: 2020) (Year: 2020).*

Chen et al., "A Fast and Accurate Dependency Parser using Neural Networks", In Proceedings of the 2014 conference on empirical methods in natural language processing (EMNLP), 2014, 11pages.

Devlin et al., "BERT: Pre-training of Deep Bidirectional Transformers for Language Understanding", arXiv:1810.04805v2 [cs.CL] May 24, 2019, 16 pages.

El-Kurdi et al., "Scalable Cross-lingual Treebank Synthesis for Improved Production Dependency Parsers", 'Grace Period Disclosure', COLING2020, 6 pages, <https://coling2020.org/>.

Goldberg et al., "A Dynamic Oracle for Arc-Eager Dependency Parsing", Proceedings of COLING 2012: Technical Papers, pp. 959-976, COLING 2012, Mumbai, Dec. 2012.

Kondratyuk et al. "75 Languages, 1 Model: Parsing Universal Dependencies Universally", arXiv:1904.02099v3 [cs.CL] Aug. 25, 2019, 17 pages.

Lample et al., "Cross-lingual Language Model Pretraining", arXiv:1901.07291v1 [cs.CL] Jan. 22, 2019, 10 pages.

Lan et al., "ALBERT: A Lite Bert for Self-Supervised Learning of Language Representations", Published as a conference paper at ICLR 2020, arXiv:1909.11942v6 [cs.CL] Feb. 9, 2020, 17 pages.

Le et al., "Distributed Representations of Sentences and Documents", arXiv:1405.4053v2 [cs.CL] May 22, 2014, 9 pages.

Liu et al., "RoBERTa: A Robustly Optimized BERT Pretraining Approach", arXiv:1907.11692v1 [cs.CL] Jul. 26, 2019, 13 pages.

Marcheggiani et al., "Encoding Sentences with Graph Convolutional Networks for Semantic Role Labeling", arXiv:1703.04826v4 [cs.CL] Jul. 30, 2017, 11 pages.

Mikolov et al., "Distributed Representations ofWords and Phrases and their Compositionality", arXiv.110.4546v1 [cs.CL] Oct. 16, 2013, 9 pages.

Moon et al., "Towards Lingua Franca Named Entity Recognition with BERT", arXiv:1912.01389v2 [cs.CL] Dec. 12, 2019, 8 pages.

Nivre et al., "Universal Dependencies v2: An Evergrowing Multilingual Treebank Collection", arXiv:2004.10643v1 [cs.CL] Apr. 22, 2020, 10 pages.

Nivre, Joakim, "Incrementality in Deterministic Dependency Parsing", Vaxjo University, Vaxjo, Sweden, 2004, 8 pages.

Pennington et al., "GloVe: Global Vectors forWord Representation", In Empirical Methods in Natural Language Processing (EMNLP), 2014, 12 pages.

Peters et al., "Deep contextualized word representations", arXiv:1802.05365v2 [cs.CL] Mar. 22, 2018, 15 pages.

Qi et al., "Universal Dependency Parsing from Scratch", arXiv:1901.10457v1 [cs.CL] Jan. 29, 2019, 11 pages.

Ruder et al., "Strong Baselines for Neural Semi-supervised Learning under Domain Shift", arXiv:1804.09530v1 [cs.CL] Apr. 25, 2018, 11 pages.

Sennrich et al., "Neural Machine Translation of Rare Words with Subword Units", arXiv:1508.07909v5 [cs.CL] Jun. 10, 2016, 11 pages.

Taylor, Wilson L., "'Cloze Procedure': A New Tool for Measuring Readability", Journalism & Mass Communication Quarterly,1953, 19 pages.

Vaswani et al., "Attention Is All You Need", 31st Conference on Neural Information Processing Systems (NIPS 2017), Long Beach, CA, USA, 11 pages.

Wang et al., "Glue: A Multi-Task Benchmark and Analysis Platform for Natural Language Understanding", Published as a conference paper at ICLR 2019, arXiv:1804.07461v3 [cs.CL] Feb. 22, 2019, 20 pages.

Wolf et al., "Transformers: State-of-the-Art Natural Language Processing", Hugging Face, Brooklyn, USA, arXiv:1910.03771v5 [cs.CL] Jul. 14, 2020, 8 pages.

Zeman et al., "CoNLL 2018 Shared Task: Multilingual Parsing from Raw Text to Universal Dependencies", Proceedings of the CoNLL 2018 Shared Task: Multilingual Parsing from Raw Text to Universal Dependencies, Brussels, Belgium, Oct. 31-Nov. 1, 2018, © 2018 Association for Computational Linguistics, 21 pages.

Zhang et al., "Graph Convolution over Pruned Dependency Trees Improves Relation Extraction", arXiv:1809.10185v2 [cs.CL] Sep. 26, 2018, 13 pages.

* cited by examiner

US 11,769,007 B2

TREEBANK SYNTHESIS FOR TRAINING PRODUCTION PARSERS

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): El-Kurdi et al., "Scalable Cross-lingual Treebank Synthesis for Improved Production Dependency Parsers", COLING2020, 6 pages, <https://coling2020.org/>.

BACKGROUND OF THE INVENTION

The present invention relates generally to the field of natural language processing, and more particularly to generating synthetic treebanks to train and improve a parser in a production system.

Treebanks are parsed, or otherwise annotated, representations of semantic or syntactic structure of text. Parsers take natural language text and generates a data structure that conveys the semantic and syntactic information contained in the natural text. Production systems, in computer science, are programs and systems that perform some task in the realm of artificial intelligence, such as a question and answer agent that automatically answers questions from users.

SUMMARY

Embodiments of the present invention provide for a method, computer program product and computer system to generate synthetic treebanks to be used in training of a parser in a production system. A processor receives a request to generate one or more synthetic treebanks from a production system, wherein the request indicates a language for the one or more synthetic treebanks. A processor retrieves at least one corpus of text in which the requested language is present. A processor provides the at least one corpus to a transformer enhanced parser neural network model. A processor generates at least one synthetic treebank associated with a string of text from the at least one corpus of text in which the requested language is present. A processor sends the at least one synthetic treebank to the production system, wherein the production system trains a parser utilized by the production system with the at least one synthetic treebank.

DETAILED DESCRIPTION

Figure 1:
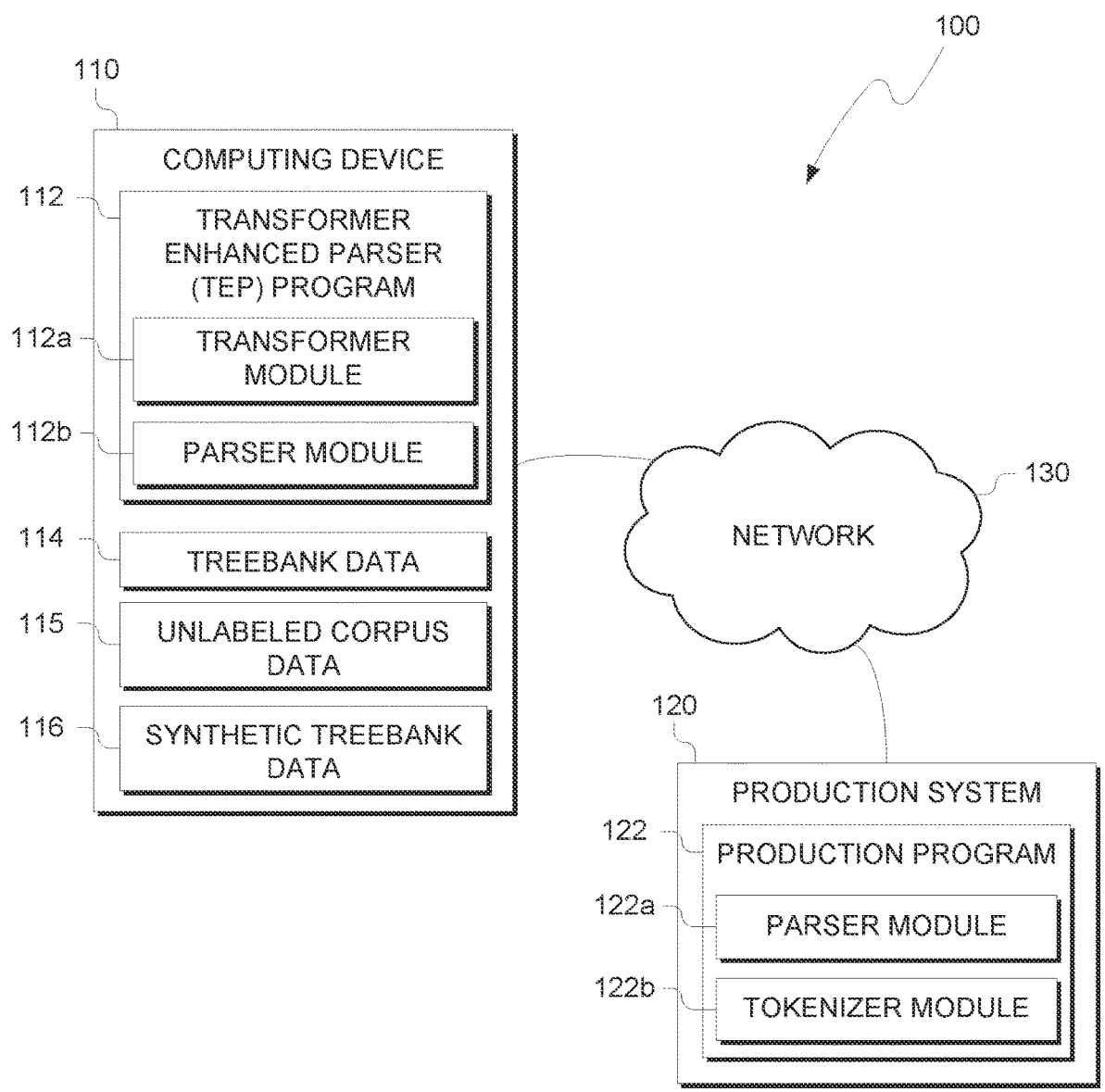
FIG. 1 is a functional block diagram illustrating a networked environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked environment, generally designated 100, in accordance with one embodiment of the present invention. Networked environment 100 includes computing device 110 and production system 120 connected over network 130. Computing device 110 includes transformer enhanced parser (TEP) program 112, transformer module 112a, parser module 112b, treebank data 114, unlabeled corpus data 115, and synthetic treebank data 116. Production system 120 includes production program 122, parser module 122a and tokenizer module 122b.

In various embodiments of the present invention, computing device 110 and production system 120 are computing devices that can be a standalone device, a server, a laptop computer, a tablet computer, a netbook computer, a personal computer (PC), or a desktop computer. In another embodiment, computing device 110 and production system 120, either individually or collectively, represent a computing system utilizing clustered computers and components to act as a single pool of seamless resources. In general, computing device 110 and production system 120 can be any computing device or a combination of devices with access to treebank data 114, unlabeled corpus data 115, and synthetic treebank data 116 and is capable of executing TEP program 112 and production program 122. Computing device 110 and production system 120 may include internal and external hardware components, as depicted and described in further detail with respect to FIG. 5.

In this exemplary embodiment, TEP program 112, transformer module 112a, parser module 112b, treebank data 114, unlabeled corpus data 115, and synthetic treebank data 116 are stored on computing device 110. Production program 122, parser module 122a and tokenizer module 122b are stored on computing device 110 production system 120. However, in other embodiments, TEP program 112, transformer module 112a, parser module 112b, treebank data 114, unlabeled corpus data 115, synthetic treebank data 116, production program 122, parser module 122a and tokenizer module 122b may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and production system 120, in accordance with a desired embodiment of the present invention.

In various embodiments, transformer enhanced parser (TEP) program 112 generates synthetic treebank data 116 that is utilized by production program 122 to train parser module 122a. Productions systems, such as production system 120, are computing systems designed to perform artificial intelligence tasks in a real-time manner, such as a chat bot or question-and-answer agent that talks in real-time with users. As such, production systems have operating parameters and resources that may be constrained or limited in order to quickly respond to users. The generation of treebanks, especially with high quality parse graphs derived from unstructured text, can often be computationally complex and are typically derived with Graphics Processing Units (GPUs), making deployment in production systems costly. Neural network based parsers are more accurate at parsing text but are slow in comparison to prior solutions, further impacting the deployment of such models to productions systems. These various requirements to the production system are further impacted by unstructured text where limited treebanks are available, such as a less spoken language or domain or topic specific data that may also be limited (e.g., where a production system would need to account for special terms and topics in a field, such as a Q and A bot for a healthcare website).

Embodiments of the present invention, in order improve parsers deployed in production systems, provide an improved method of generating synthetic treebanks utilizing a transformer model in conjunction with a parser. Synthetic treebanks are treebanks that are automatically generated by a program, such as TEP program 112. In certain scenarios, such as when handling natural language processing (NLP) of text from a lesser used language or in a domain that is limited, human annotated treebanks will not be easily, nor abundantly, available to train a parser, such as parser module 122a, which as discussed herein may be referred to as production parser 122a or production parser module 122a. However by generating synthetic treebanks for limited domains or languages, production parser 122a is able to be trained and handle scenarios were a user may speak a language or discuss a topic that has limited training set, while keeping the operating parameters of production system 120.

Figure 2:
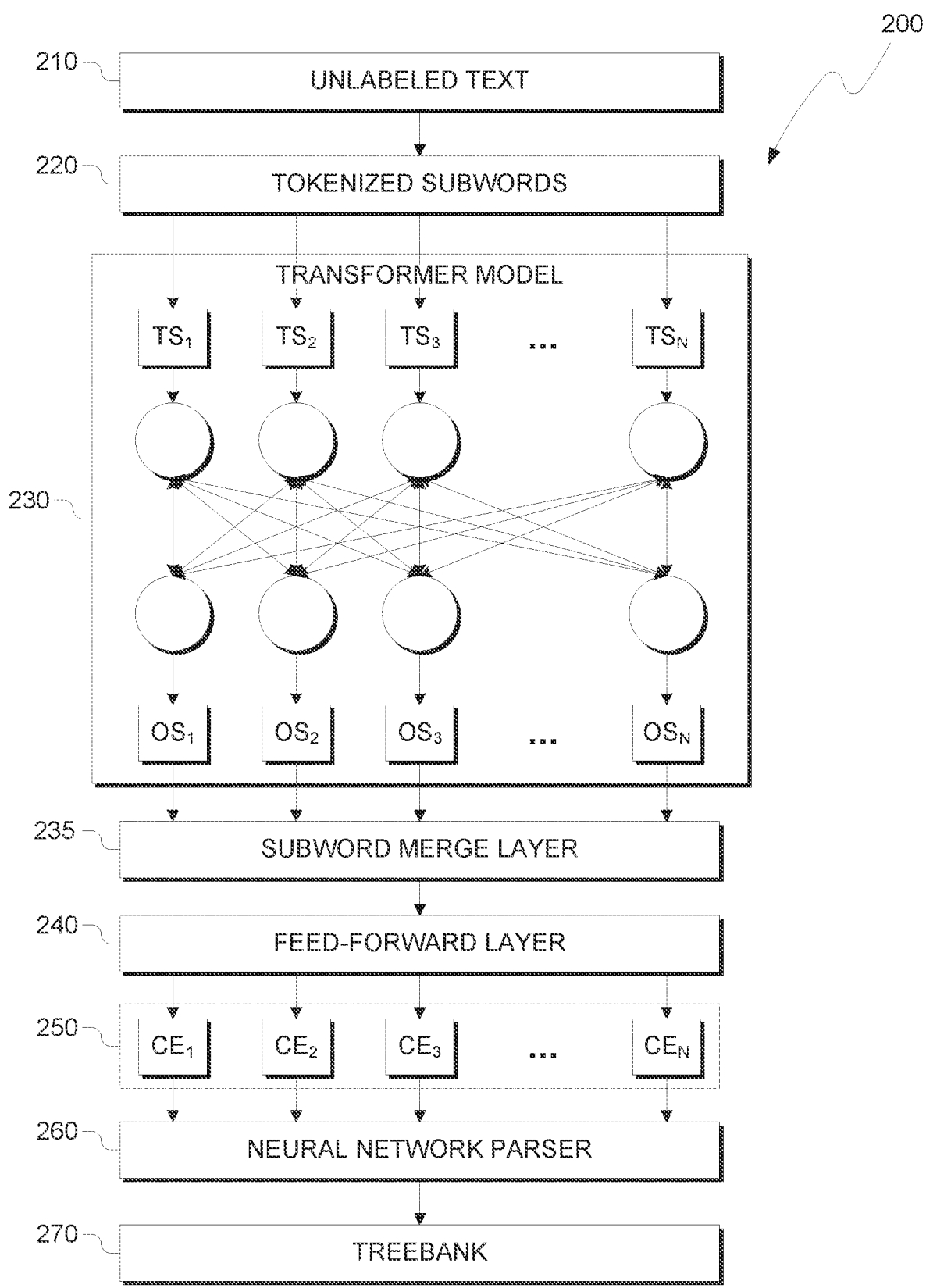
FIG. 2 illustrates a block diagram of a transformer enhanced parser model.

In various embodiments, TEP program 112 includes a model that combines a transformer model (i.e., transformer module 112a) with a parser model (i.e., parser module 112b), in addition to interconnect logic between both models, as depicted in FIG. 2. Transformer module 112a employs transformer model 230 that is a neural network similar to connected layers of self-attention, normalization and feed-forward, inasmuch that sequential input data is provided (e.g., such as words in a sentence) and that the model comprise an encoding input layer that provides contextualized embedding to parser module 112b. Example transformer models include, but are not limited to, Bidirectional Encoder Representations for Transformers (BERT), Cross-lingual language models (XLM), or any transformer model with bidirectional attenuation.

In various embodiments, transformer model 230 is a pretrained model directed towards a specific language or multiple languages. In some scenarios, transformer model 230 is a pretrained model directed a particular domain or topic. While the forgoing discussion discusses scenarios where a single pretrained model is utilized for transformer model 230, one of ordinary skill in the art will appreciate that TEP program 112 may retrieve or maintain multiple models for a variety of scenarios, such as multiple models for multiple languages that production system 120 may need treebanks for training the production parser module 122a of production program 122.

In various embodiments, transformer model 230 is interconnected, via subword-merge layer 235 and feed-forward layer 240, to neural network parser 260. Neural network parser 260 includes an encoder layer that connects to a multilayer perceptron that then chooses an output vector which creates dependencies and mappings of a treebank. For example, neural network parser 260 is a biaffine parser or a Stanford parser. One of ordinary skill in the art will appreciate that any parser may be used instead, or in conjunction with neural network parser 260 without deviating from the invention. In some embodiments or scenarios, neural network parser 260, or any other equivalent parser, is to be of a higher quality or more accurate than that other parser module 122a of production program 122. As previously stated, production systems, such as production system 120, typically have speed and responsiveness as key design features. As such, parser module 122a of production program 122 will lack accuracy and may deploy non-neural network based solutions; whereas parser module 112b of TEP program 112 may have additional computing resources allocated to computing device 110 allowing for a higher quality parser to be deployed. In some scenarios, quality of a parser may be based on the labeled attachment score (LAS) of the deployed parser.

In various embodiments, production system 120 includes production program 122. Production program 122 performs some artificial intelligence task that requires the digesting and understanding of text. For example, production program 122 may provide text summarization services that summarize a body of text. As another example, production program 122 is a chat bot that interacts and responds to a user via chat or voice. One of ordinary skill in the art will appreciate that production program 122 may perform any task which requires the parsing of text or transcribed voice to be performed by parser module 122a without deviating from the invention. Parser module 122a generates treebanks of received text received from tasks production program 122 is assigned to perform. However, limited resources and requirements may limit the quality of parser module 122a production system 120 may be able to deploy. Additionally, given the variety of users that may interact with production program 122, parser module 122a may not be trained or capable of digesting text from certain languages with limited treebanks (e.g., Hindi) or domains (e.g., a bill pay bot answering maintenance questions). In some scenarios, production program 122 sends the unstructured text to TEP program 112 to be parsed. In other scenarios, TEP program 112 sends one or more synthetic treebanks to production program 122 to train parser module 122a. In some embodiments, production program 122 includes tokenizer module 122b that tokenizes or separates the unstructured text into subwords. Subwords are smaller fragments of each word in the unstructured text. For example, the text for "reject" may be segmented into two tokens "re" and "ject".

In various embodiments, TEP program 112 trains parser module 112b in order to parse text for certain languages. Treebank data 114 includes various parsing graphs for the target language or domain. Based on the deployed transformer model in transformer module 112a, TEP program 112 undergoes one of two training methodologies, monolingual and multilingual. When parser module 112b is to be trained to handle only a single language, monolingual training is used. Pretrained monolingual Transformer models are available for certain languages, such as English, German, and French. When multiple languages are to be handled, parser module 112a deploys multilingual transformer models, such as Multilingual-BERT (M-BERT) which is trained to operate on over a hundred different languages. When using M-BERT, both monolingual as well as multilingual treebanks can be used to train the parser. Based on if the TEP program 112 is to handle monolingual or multilingual treebank generation, TEP program 112 retrieves the corresponding treebanks from treebank data 114. For domain specific training, treebank data 114 also includes treebanks for separated into various domains and topics. Based on the type of domain needed to be trained, TEP program 112 selects a corresponding corpus or collection of treebanks from treebank data 114.

In various embodiments, TEP program 112 maintains unlabeled corpus data 115 which includes a variety of unlabeled text from a variety of domains and language. As discussed herein, once TEP program 112 is trained for a particular language or domain, TEP program 112 is capable of generating synthetic treebanks without human supervision. To generate the synthetic treebanks, TEP program 112 requires unlabeled text from the domain or language. As such, TEP program 112 has access to or otherwise includes a variety of corpora across numerous domains and languages in order to generate synthetic treebanks for those domains or languages.

FIG. 2 illustrates block diagram of transformer enhanced parser model 200. Once trained either for a language or domain, transformer enhanced parser model 200 utilized by TEP program 112 is able to generate treebanks automatically without human intervention or input (i.e., synthetic treebanks). Initially transformer enhanced parser model 200 is supplied unstructured or unlabeled text 210. Unlabeled text 210 is any string or series of words that do not have any markup or annotation, such as a treebank. Unlabeled text 210 may be selected from a variety of corpora in which the language or domain is present or discussed. Then TEP program 112 tokenizes the text into subwords. Subwords are the words from unlabeled text 210 that are separated into parts, such as syllables, or any subset of characters of fixed or varying size. For example, the word "delay" could be separated into syllables as "de" and "lay" or as a fixed one-character wide group as "d", "e", "l", "a" and "y". Example subword tokenization methodologies include, but are not limited to, WordPiece, Byte Pair Encoding and the unigram language model.

Once tokenized, TEP program 112 feeds the tokenized unlabeled text 210 into transformer model 230. Transformer model 230 is a encoder neural network with two corresponding layers where tokenized subwords (i.e., $TS_{1-N}$) are fed into the encoder layer of transformer model 230. The output of the Transformer encoder is a sequence of contextualized subword embeddings. Prior to being fed into the neural network parser 260, subword-merge layer 235 and feed-forward layer 240 and the resulting contextualized word embeddings 250 (i.e., $CE_{1-N}$) serve as interconnect logic between the neural networks of transformer model 230 and neural network parser 260. The interconnect logic (i.e., subword-merge layer 235 and feed-forward layer 240) merges back the subword embeddings into contextualized word embeddings, while maintaining the embeddings generated by the layer of transformer model 230.

Neural network parser 260 is a parser with a higher labeled attachment score (LAS) when compared to the production parser production program 122. Neural network parser 260 is a neural network with an encoder layer that connects to a multilayer perceptron that then chooses an output vector which creates dependencies and mappings of a treebank. The output of neural network parser 260 is a parsed sentence structure, treebank 270, of unlabeled text 210. Based on this operation of the transformer enhanced parser model 200 synthetic treebanks can be generated for any unstructured text, permitting the creation of training sets for other parsing models, such as parser module 122a of production program 122.

Figure 3:
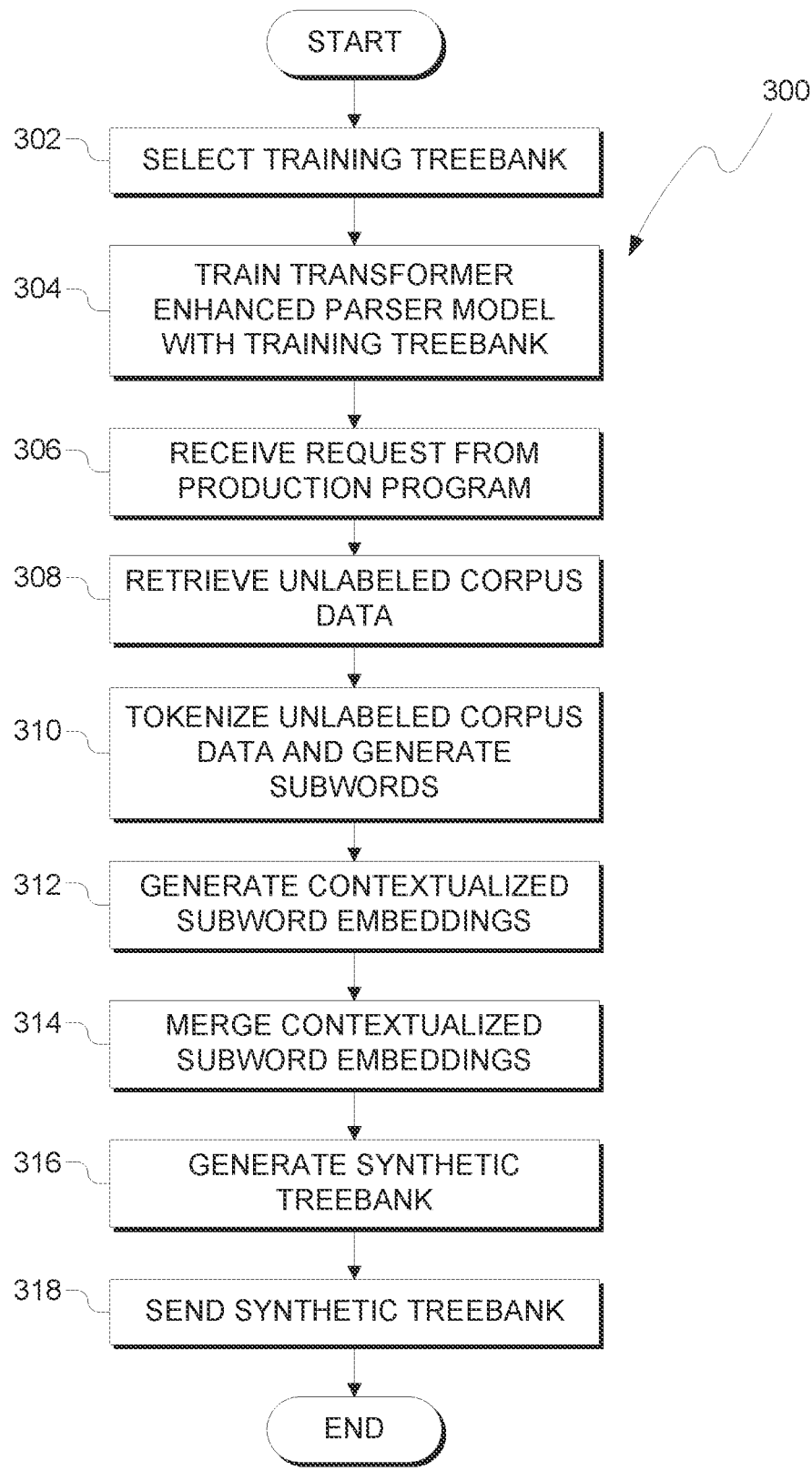
FIG. 3 illustrates operational processes of a transformer enhanced parser program, on a computing device within the environment of FIG. 1, in accordance with an exemplary embodiment of the present invention.

FIG. 3 illustrates operational processes, generally designated 300, of transformer enhanced parser (TEP) program 112. In processes 302 and 304, TEP program 112 train the transformer enhanced parser model 200 discussed in FIG. 2. Based on the languages or domains that will be supported, in process 302, TEP program 112 selects a training treebank. In some scenarios, one or more transformer enhanced parser models may be maintained by TEP program 112 with the separate models used to cover differing languages or domains that will be supported. In other scenarios, such as when a multi-lingual transformer model is deployed, TEP program 112 may support multiple languages and domains with a single model.

In process 304, TEP program 112 trains the transformer enhanced parser model 200 with the selected treebank. TEP program 112 uses the selected treebanks as values in the treebank 270 portion of transformer enhanced parser model 200 as well as the corresponding text of the treebank as unlabeled text 210. Via backpropagation of the model, transformer enhanced parser model 200 modifies the various attention weights in neural network parser 260 and transformer model 230 such that the model arrives at both unlabeled text 210 and treebank 270 being equivalent to the training data selected in process 302. In some scenarios, such as when transformer model 230 is pretrained, TEP program 112 may freeze the layers in transformer model 230 for faster training of neural network parser 260.

In processes 306-318, TEP program 112 generates synthetic treebanks to provide to a production system. During processes 306-318, TEP program 112 sets transformer enhanced parser model 200 to an inference mode. While discussed as a single iteration, one of ordinary skill in the art will appreciate that processes 306-318 may be repeated to generate multiple treebanks. In process 306, TEP program 112 receives a request from production program 122 for synthetic treebanks to use to train the production parser, parser module 122a. The request will indicate a language or domain for which production program 122 would like to train parser module 122a. In process 308, TEP program 112 selects from unlabeled corpus data 115 unlabeled text associated with the language or domain received with the request in process 306. In process 310, TEP program 112 tokenizes the text from unlabeled corpus data and separates the tokenized words into tokenized subwords, such as tokenized subwords 220 depicted in FIG. 2, where each word is in the unlabeled text is broken into smaller parts (e.g., such as WordPiece, Byte Pair Encoding or the unigram language model).

In process 312, TEP program 112 generates contextualized word embeddings by feeding the tokenized subwords 220 into transformer model 230. The contextualized word embeddings indicate the probability of the output layer to predict the subsequent subword. In process 314, TEP program 112 merges or recombines the contextualized subwords back into the words with embeddings from derived from unlabeled text 210. Subword-merge layer 235 recombines the subwords while keeping the attention embeddings derived from transformer model 230 as contextualized word embeddings 250 (i.e., $CE_{1-N}$). TEP program 112 feeds the recombined subwords to neural network parser 260 which has been trained in processes 302 and 304 the generate synthetic treebanks (process 316). In process 318, TEP program 112 sends the generated treebanks to the production program 122 which, in turn, trains the parser module 122a deployed by production system 120. As previously discussed, processes 206-318 may be repeated to generate a desired number of synthetic treebanks.

Figure 4:
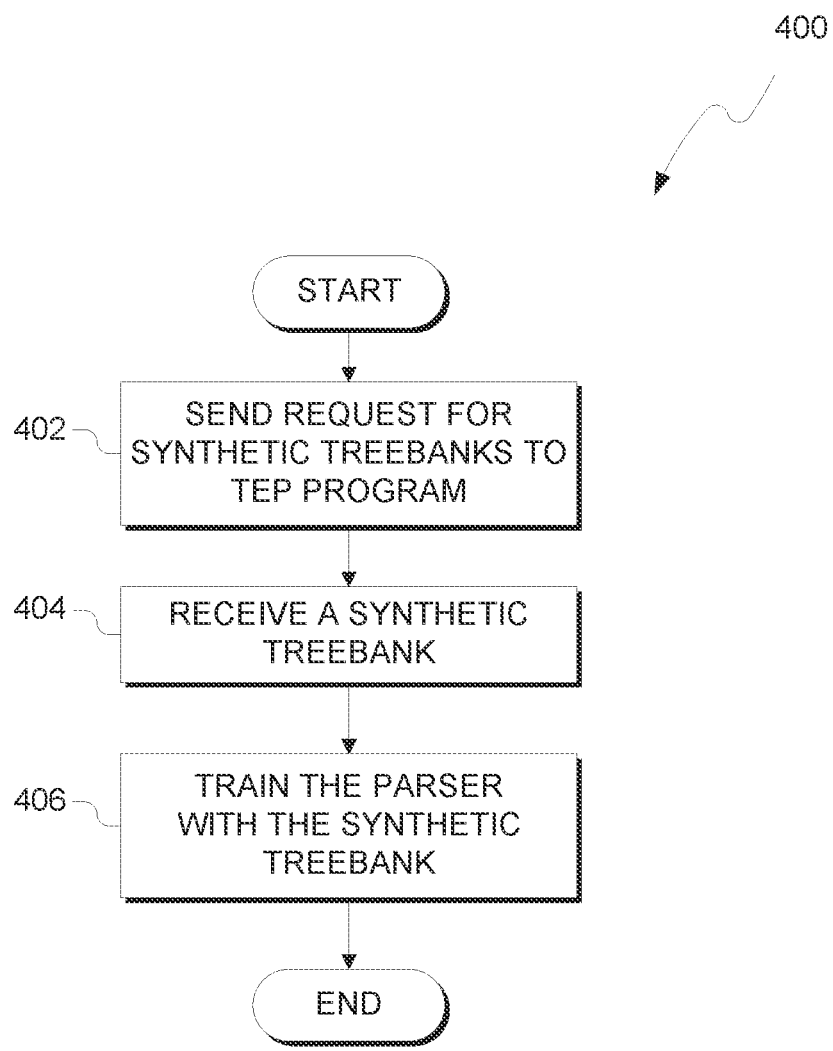
FIG. 4 illustrates operational processes of a production program, on a computing device within the environment of FIG. 1, in accordance with an exemplary embodiment of the present invention.

FIG. 4 illustrates operational processes, generally designated 400, of production program 122. In process 402, production program 122 sends a request to TEP program 112 to generate one or more synthetic treebanks to be used to train parser module 122a. The request indicates a language or domain for which parser module 122a is to be trained to handle. Additionally, the request may also include an amount of synthetic treebanks desired for training. After receiving the request, TEP program 112 proceeds with one or more iterations of processes 306-318 depicted in FIG. 3.

In process 404, production program 122 receives at least one synthetic treebank from TEP program 122. Each synthetic, as previously discussed, treebank is automatically generated by TEP program 112 without human supervision or intervention, thereby creating treebanks for limited domains or languages. In process 406, production program 122 trains parser module 122a with the received synthetic treebank or treebanks received in process 404. Depending on the parser deployed by production system 120, production program 122 may perform different training methodologies for parser module 122a. For example, production parser module 122a may include the Arc-swift parser which utilizes a convolutional neural network.

Figure 5:
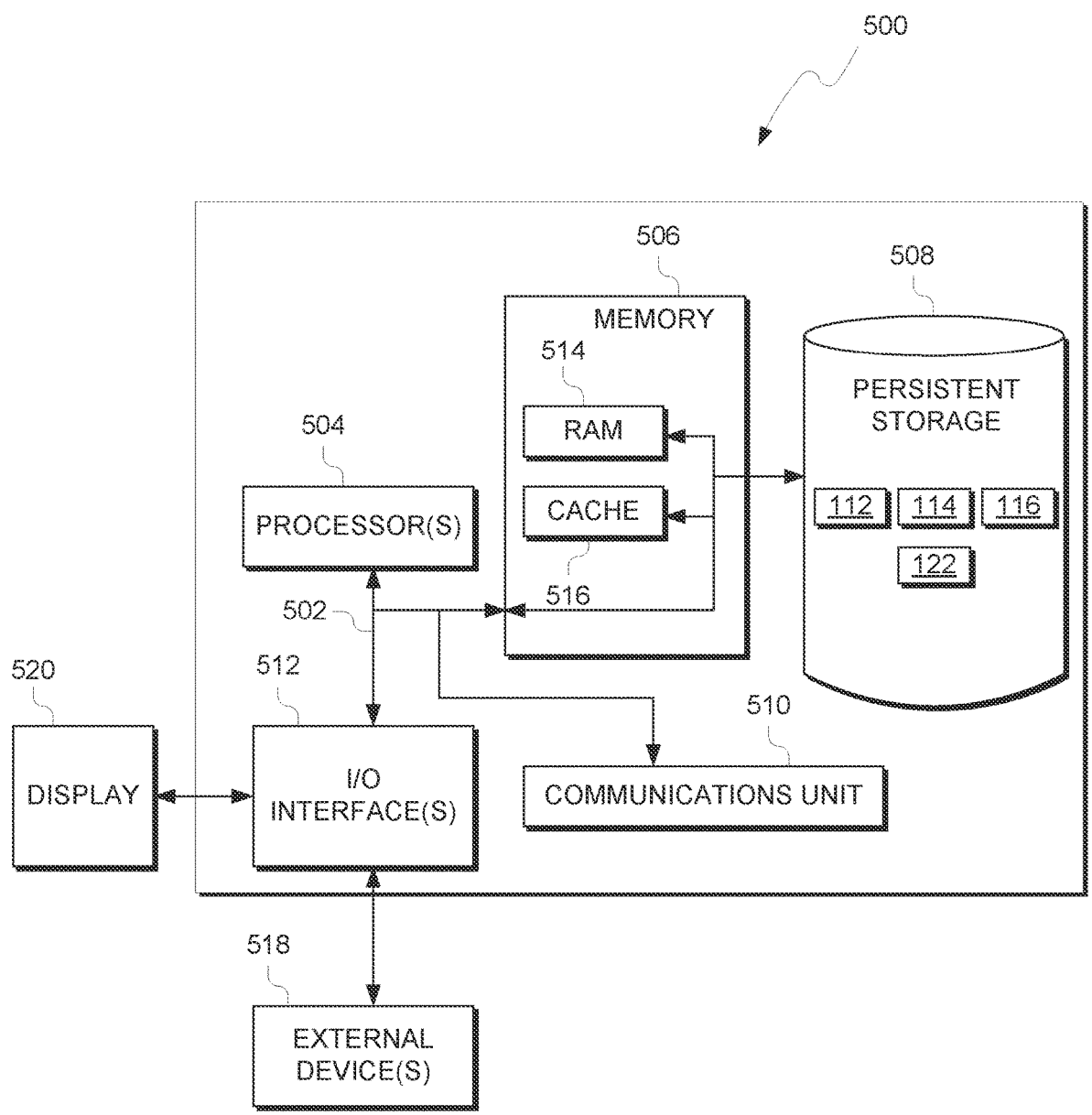
FIG. 5 depicts a block diagram of components of the computing device executing a transformer enhanced parser program or a production program, in accordance with an exemplary embodiment of the present invention.

FIG. 5 depicts a block diagram, 500, of components of computing device 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and production system 210 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

TEP program 112, transformer module 112a, parser module 112b, treebank data 114, unlabeled corpus data 115, synthetic treebank data 116, production program 122, parser module 122a and tokenizer module 122b are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. TEP program 112, transformer module 112a, parser module 112b, treebank data 114, unlabeled corpus data 115, synthetic treebank data 116, production program 122, parser module 122a and tokenizer module 122b may be downloaded to persistent storage 508 through communications unit 510.

I/O interface(s) 512 allows for input and output of data with other devices that may be connected to computing device 110 or production system 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., TEP program 112, transformer module 112a, parser module 112b, treebank data 114, unlabeled corpus data 115, synthetic treebank data 116, production program 122, parser module 122a and tokenizer module 122b, can be stored on such portable computer-readable storage media and can be loaded onto persistent storage 508 via I/O interface(s) 512. I/O interface (s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for generating synthetic treebanks to be used in training a parser in a production system, the method comprising:
    receiving, by one or more processors, a request to generate one or more synthetic treebanks from a production system, wherein the request indicates a language for the one or more synthetic treebanks;
    retrieving, by the one or more processors, at least one corpus of text in which the requested language is present;
    providing, by the one or more processors, the at least one corpus to a transformer enhanced parser neural network model;
    generating, by the one or more processors, at least one synthetic treebank associated with a string of text from the at least one corpus of text in which the requested language is present, wherein the at least one synthetic treebank is generated with unsupervised training of the transformer enhanced parser neural network model; and
    sending, by the one or more processors, the at least one synthetic treebank to the production system, wherein the production system trains a parser utilized by the production system with the at least one synthetic treebank.

2. The computer-implemented method of claim 1, wherein the at least one corpus of text includes a corpus directed towards a limited language or domain.

3. The computer-implemented method of claim 2, wherein the transformer enhanced parser neural network model includes one of the following pretrained transformer models: a bidirectional encoder representations for transformers (BERT) model or a cross-lingual language model (XLM).

4. The computer-implemented method of claim 1, the transformer enhanced parser neural network model includes a neural-network parser.

5. The computer-implemented method of claim 4, wherein the parser utilized by the production system is of lower quality than the neural-network parser.

6. The computer-implemented method of claim 1, wherein the transformer enhanced parser neural network model separates one or more words of the at least one corpus of text into subwords.

7. A computer program product for generating synthetic treebanks to be used in training of a parser in a production system, the computer program product comprising:
- one or more computer-readable storage media and program instructions stored on the one or more computer-readable storage media, the program instructions comprising:
  - program instructions to receive a request to generate one or more synthetic treebanks from a production system, wherein the request indicates a language for the one or more synthetic treebanks;
  - program instructions to retrieve at least one corpus of text in which the requested language is present;
  - program instructions to provide the at least one corpus to a transformer enhanced parser neural network model;
  - program instructions to generate at least one synthetic treebank associated with a string of text from the at least one corpus of text in which the requested language is present, wherein the at least one synthetic treebank is generated with unsupervised training of the transformer enhanced parser neural network model; and
  - program instructions to send the at least one synthetic treebank to the production system, wherein the production system trains a parser utilized by the production system with the at least one synthetic treebank.

8. The computer program product of claim 7, wherein the at least one corpus of text includes a corpus directed towards a limited language or domain.

9. The computer program product of claim 8, wherein the transformer enhanced parser neural network model includes one of the following pretrained transformer models: a bidirectional encoder representations for transformers (BERT) model or a cross-lingual language model (XLM).

10. The computer program product of claim 7, the transformer enhanced parser neural network model includes a neural-network parser.

11. The computer program product of claim 10, wherein the parser utilized by the production system is of lower quality than the neural-network parser.

12. The computer program product of claim 7, wherein the transformer enhanced parser neural network model separates one or more words of the at least one corpus of text into subwords.

13. A computer system for generating synthetic treebanks to be used in training of a parser in a production system, the computer system comprising:
- one or more computer processors;
- one or more computer readable storage media; and
- program instructions stored on the computer readable storage media for execution by at least one of the one or more processors, the program instructions comprising:
  - program instructions to receive a request to generate one or more synthetic treebanks from a production system, wherein the request indicates a language for the one or more synthetic treebanks;
  - program instructions to retrieve at least one corpus of text in which the requested language is present;
  - program instructions to provide the at least one corpus to a transformer enhanced parser neural network model;
  - program instructions to generate at least one synthetic treebank associated with a string of text from the at least one corpus of text in which the requested language is present, wherein the at least one synthetic treebank is generated with unsupervised training of the transformer enhanced parser neural network model; and
  - program instructions to send the at least one synthetic treebank to the production system, wherein the production system trains a parser utilized by the production system with the at least one synthetic treebank.

14. The computer system of claim 13, wherein the at least one corpus of text includes a corpus directed towards a limited language or domain.

15. The computer system of claim 14, wherein the transformer enhanced parser neural network model includes one of the following pretrained transformer models: a bidirectional encoder representations for transformers (BERT) model or a cross-lingual language model (XLM).

16. The computer system of claim 13, the transformer enhanced parser neural network model includes a neural-network parser.

17. The computer system of claim 16, wherein the parser utilized by the production system is of lower quality than the neural-network parser.

18. The computer system of claim 13, wherein the transformer enhanced parser neural network model separates one or more words of the at least one corpus of text into subwords.

* * * * *